United States Patent [19]

Lum et al.

[11] Patent Number: 5,003,238

[45] Date of Patent: Mar. 26, 1991

[54] METHOD AND APPARATUS OF FINE TUNING THE POSITION OF AN ULTRASONIC SENSOR PROBE USING ANALOG MOTOR POSITION SIGNALS

[75] Inventors: John J. Lum, San Francisco; John L. Schultz, Santa Clara, both of Calif.

[73] Assignee: Diasonics, Inc., Milpitas, Calif.

[21] Appl. No.: 487,524

[22] Filed: Mar. 2, 1990

[51] Int. Cl.⁵ .............................................. G05B 11/18
[52] U.S. Cl. ..................................... 318/592; 318/593; 318/594; 250/231.16
[58] Field of Search ....................... 318/592, 593, 594; 250/231.16

[56] References Cited

U.S. PATENT DOCUMENTS

4,599,547 7/1986 Ho ....................................... 318/594
4,644,157 2/1987 Ozawa et al. ................... 250/231.16

Primary Examiner—William M. Shoop, Jr.
Assistant Examiner—Saul M. Bergmann
Attorney, Agent, or Firm—Blakely, Sokoloff, Taylor & Zafman

[57] ABSTRACT

As disclosed herein, a new and improved method and apparatus provide for fine tuning the position of a servomotor used to drive a transducer mounted on an ultrasound probe to a desired position. This improvement is accomplished by processing the analog quadrature output signals of an incremental optical encoder, coupled to the servomotor. The improvement uses the positional information derived from the analog quadrature output signals. The analog quadrature output signals, defined as sine and cosine, are converted to digital square waves. The digital square waves are decoded to produce digital position quadrants, wherein each quadrant represents a specific motor position. The corresponding digital square waves are also decoded by a logic array device and coupled to the select input of an analog switch. The analog quadrature output signals are also coupled to an analog device that converts the output signals to four phase shifted sinusoidal wave forms, having a linear portion within a digital position quadrant. The select signals from the logic array device select one of the four phase shifted wave forms. The output of the analog switch is then compared to a reference signal. The resulting output from the comparison is an analog error signal. This analog error signal forces the motor towards the zero crossing within a digital position quadrant.

10 Claims, 8 Drawing Sheets

FIG_4

FIG_5  B LEADS A

FIG_6  B LEADS A

FIG_7  A LEADS B (A) $_{A(X)}$
6V (B) $_{B(X)}$
6V

FIG_8  A LEADS B

(A) $_{TTLA}$

POSITION COUNT M | M-1 | M-2 | M-3 | M-4 | M-5 | M-6

(B) $_{TTLB}$ (C) $_{Y\emptyset(X)}$
6V (D) $_{Y1(X)}$
6V (E) $_{Y2(X)}$
6V (F) $_{Y3(X)}$
6V

METHOD AND APPARATUS OF FINE TUNING THE POSITION OF AN ULTRASONIC SENSOR PROBE USING ANALOG MOTOR POSITION SIGNALS

BACKGROUND OF THE INVENTION

1. Field of the Invention

This invention relates to a position control loop using a servomotor to control the movement of a transducer in mechanically scanning probes, and more specifically, to a method of using an analog quadrature output of an incremental optical encoder to precisely servo the motor at a given command position.

2. Description of Related Art

In a conventional position control loop, the motor position is compared with a requested position. The comparison or difference between the two positions is used to create a position error signal. The magnitude and polarity of this position error signal is then used to drive the motor towards the commanded input, thus, reducing the position error signal to zero. In this manner, the motor is directed to a specific position.

The motor position can be sensed in a number of different ways, yielding either an analog or a digital output signal representative of the motor position. Typically, a standard servomotor produces a single output signal from the shaft encoder. The output signal is generally in the shape of signal pulses or steps. When the operator commands the servomotor to move to a specific position, for example a position defined by 3000 counts, an up/down counter counts out 3000 pulses. The output of the up/down counter is compared to the count representing the present position of the motor and the counter causes the motor to move up or down depending on the present position of the motor. Theoretically, the motor stops when the counter reaches a count of 3000.

However, the momentum of the motor may cause the motor to move beyond the requested position, for example to a count of 3003. The present motor position is then compared with the requested position and the motor is directed to move in the appropriate direction.

For example, if the difference between the requested position and the present position of the motor is a positive difference, the motor is directed to move in the forward direction. On the other hand, if the difference between the two positions results in a negative difference, the motor will move backwards. As a result, the accuracy of the position of the motor is controlled by the resolution of the shaft encoder.

To improve the accuracy of the position of the motor, an incremental optical encoder with analog quadrature (sine and cosine) output signals is used to sense motor positions. By overdriving a comparator and limiting the output of the comparator, the analog output signals are converted to square waves. The quadrature square waves are then decoded into "quadrants" by any number of well-known prior art circuits to produce a digital counter representing absolute motor position. These quadrature signals are referenced to an index signal that is also converted to a square wave. The digital motor position is then compared to the digital input command signal to produce a digital position error signal.

It is advantageous to use an incremental optical encoder for this application, since no encoder calibration is required. Furthermore, the outputs of the encoder are compensated and result in repeatable motor position outputs, in addition to improving the resolution of the motor position. However, since the position signal is digital, the maximum resolution of the motor position obtainable is determined by the width of one "quadrant."

However, the maximum resolution of a single quadrant width gives rise to an inherent disadvantage of using an incremental optical encoder. When the motor stops and remains within the quadrant defining the requested position, external forces on the motor do not cause a position control loop to generate any position error signals. However, when the motor moves across a boundary as defined by combinations of rising edges and/or falling edges, that is, from one quadrant to the next higher or lower quadrant, an error signal is generated. This error signal forces the motor back into the proper quadrant.

As the motor is forced back into the proper quadrant, it may overshoot into the lower adjacent quadrant, that is, in the other direction. Again, an error signal of the proper polarity is generated, forcing the motor back into the proper quadrant where it again may overshoot. This repetitive overshooting in either direction causes "dithering" of the motor between adjacent boundaries of the desired quadrant. This dithering can be a contributing source of error in ultrasound measurements, particularly when the transducer of an ultrasound sensing probe is operating in Doppler mode or M-Mode.

Therefore, what is needed is a method of generating a motor position signal within the desired digital quadrant position itself. This method of generating a position signal will precisely locate the servomotor in the middle of the quadrant when the motor is requested to stop at a given quadrant position.

SUMMARY OF THE PRESENT INVENTION

As disclosed herein, a new and improved method provides for the fine tuning of a servomotor used to drive an ultrasound transducer to a desired position. The improvement is accomplished by a process that uses positioning information already generated to sense the position of the servomotor.

The position control loop used to position the servomotor uses the analog quadrature outputs of an incremental optical encoder. These analog outputs are converted to square wave forms using a squaring means and are compatible with TTL signals. The quadrature TTL signals are then decoded into "quadrants" by a decoding device to produce signals that represent the absolute motor position.

The digital motor position is then compared to the digital input position command to produce a digital position error signal. The digital position error signal is converted to an analog error signal. The analog error signal is then amplified. This amplified error signal drives the servomotor.

Advantageously, an incremental optical encoder is used in the preferred embodiment for a number of reasons, in particular no encoder calibration is necessary. Additionally, the outputs of the encoder are compensated and result in repeatable motor positions.

Although the incremental optical encoder provides for a very accurate motor position, the resolution is limited to a maximum resolution of one "quadrant." The position control loop provides for the generation of position error compensation signal, responsive to the motion of the motor. The error signal is generated only as the motor crosses the boundary of the desired position "quadrant."

In particular, the present invention comprises an improvement in generating an error signal responsive to the motor position, within the desired position "quadrant." The improvement comprises a summing and subtraction means, a switching means and a referencing means.

The summing and subtraction means operate on the analog quadrature signals output from the incremental optical encoder, by producing four (4) analog 90° phase shifted sinusoidal waveforms for generating an analog motor position signal within the digital quadrant position.

The linear portions of the analog sinusoidal waveforms are referenced to the output of the referencing means and is a linear function of the motor position. The zero crossing of the linear portions of the sinusoidal waveforms correspond to the middle of the respective digital quadrant positions.

When the motor is commanded to stop in a desired digital quadrant position, the appropriate sinusoidal waveform is switched into the position control loop by way of a switching means. The switching means receives control signals from a logic array device to select the appropriate sinusoidal waveform. The digital quadrature signals are decoded by the logic array device to yield the set of control signals.

The output of the referencing means is also switched into the loop. The analog motor position is compared to the output of the referencing means to create a continuous analog position error signal. The error signal is used to correct any motor position drift within the desired digital quadrant.

The position control loop forces the analog position error towards zero, the crossing position corresponding to the middle of the desired position quadrant. By forcing the error signal towards zero, the motor is forced towards the zero crossing of the analog motor position signal, that is the middle of the position quadrant.

By this combination of steps, the motor position of an ultrasound sensing probe can be positioned at a desired location without the detriments of motor dither associated with a position control loop relying merely on the maximum resolution available with a digital quadrant position control loop.

BRIEF DESCRIPTION OF THE DRAWINGS

FIGS. 5(a-b) are graphic representations of the sine and cosine of the analog quadrature signals as described in FIG. 1, where B(x)(cosine) leads A(x)(sine).

FIGS. 6(a-f) are graphic representations of the square wave forms and analog sinusoidal wave forms equivalent to the analog quadrature signals of FIGS. 5(a-b):

(a) a graphic representation of square wave equivalent of FIG. 5(a); (b) a graphic representation of square wave equivalent to FIG. 5(b);

(c) a graphic representation of analog sinusoidal wave form corresponding to Y0(x) derived from the analog signals of FIGS. 5(a-b);

(d) a graphic representation of analog sinusoidal wave form corresponding to Y1(x) derived from the analog signals of FIGS. 5(a-b);

(e) a graphic representation of analog sinusoidal wave form corresponding to Y2(x) derived from the analog signals of FIGS. 5(a-b);

(f) a graphic represenatation of analog sinusoidal wave form corresponding to Y3(x) derived from the analog signals of FIGS. 5(a-b).

FIGS. 7(a) and 6(b) are graphic representations of the sine and cosine of the analog quadrature signals as described in FIG. 1, where A(x)(sine) leads B(x)(cosine).

FIGS. 8(a-f) are graphic representations of the square wave forms and analog sinusoidal wave forms equivalent to the analog quadrature signals of FIGS. 7(a-b):

(a) a graphic representation of square wave equivalent of FIG. 7(a);

(b) a graphic representation of square wave equivalent to FIG. 7(b);

(c) a graphic representation of analog sinusoidal wave form corresponding to Y0(x) derived from the analog signals of FIGS. 7(a-b);

(d) a graphic representation of analog sinusoidal wave form corresponding to Y1(x) derived from analog signals of FIGS. 7(a-b);

(e) a graphic representation of analog sinusoidal wave form corresponding to Y2(x) derived from analog signals of FIGS. 7(a-b);

(f) a graphic representation of analog sinusoidal wave form corresponding to Y3(x) derived from analog signals of FIGS. 7(a-b).

DETAILED DESCRIPTION OF THE PREFERRED EMBODIMENT

A method and apparatus for using analog quadrature outputs of an incremental optical encoder to generate an analog motor position signal within a digital quadrant position is described. In the following descriptions, numerous specific details such as specific model numbers of electronic devices, specific values of resistors and capacitors, etc. are set forth in order to provide a more thorough understanding of the present invention. It will be obvious, however, to one skilled in the art that the present invention may be practised without these specific details. In other instances, well known circuits and structures have not been shown in detail in order not to unnecessarily obscure the present invention.

The following is a detailed description of a method and apparatus that uses an analog quadrature output of an incremental optical encoder to generate an analog motor position signal within a digital quadrant position. This analog motor position signal is used to precisely servo the motor driving a transducer mounted on a mechanical ultrasound probe to the middle of the quadrant when an operator commands the probe motor to stop at a given quadrant position.

Figure 1:
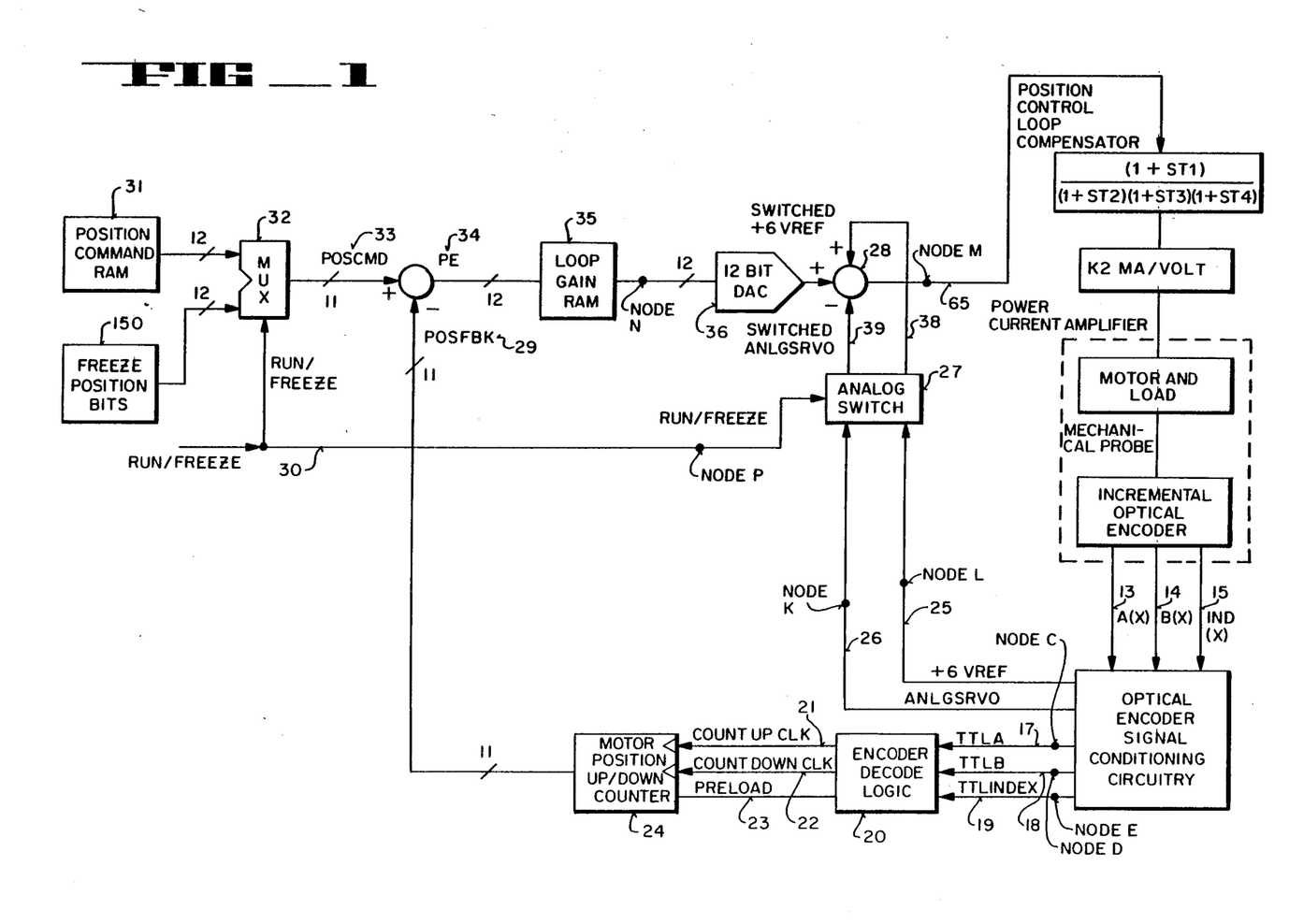
FIG. 1 is a simplified block diagram representative of the position control loop of the preferred embodiment of the present invention.

Referring to FIG. 1, the present invention is embodied in the block diagram representation of an apparatus used to generate the analog motor position signal. When the operator desires the transducer mounted on the mechanical probe 10 to be positioned within a certain location, the operator generates a position command signal (POSCMD) 33 which is then stored in the position command RAM 31. Additionally, a run/freeze signal is generated and is represented by the control line 30.

The output signal of the position command RAM 31 and the freeze position bits 50 are input into a multiplexer 32. A run/freeze control line 30 is used to select either the position command RAM 31 or the freeze position bits 50 as the output of the multiplexer 32. The multiplexer 32 used in the preferred embodiment is an ALS257, although any multiplexer providing the proper output would be within the scope of the present invention.

The multiplexer 32 generates an output signal identified as the POSCMD 33. The POSCMD 33 instructs the motor 11 to incrementally move to the position designated by the operator. When the motor is commanded to move, the POSCMD 33 is derived from the position command RAM 31. When the motor 11 reaches the desired position, the run/freeze control line 30 which is detected by a position compare circuit (not shown), switches the POSCMD 33 from the position command RAM 31 to the freeze position bits 50.

The value of the freeze position bits 50 correspond to the desired stop position. A method of switching the run/freeze bit would be to compare the actual motor position with the desired motor stop position. When the motor 11 reaches the desired stop position, a computer interrupt is generated. This tells the system to switch the run/freeze bit 50 to freeze.

The POSCMD 33 is coupled to the input of a loop gain RAM 35. The output of the loop gain RAM 35 is then coupled to the input of a 12 bit DAC 36. The output of the 12 bit DAC 36 is coupled to a position control loop compensator 37. In the preferred embodiment, the position control loop compensator 37 is an analog filter and stabilizes the control loop.

Since the signal being output by the position loop compensator 37 is not sufficient to drive the motor 11, the output of the loop compensator 37 is coupled to the input to a power current amplifier 38. The output of the power current amplifier 38 is now sufficient to drive the motor 11 of the mechanical probe 10.

Figure 5:
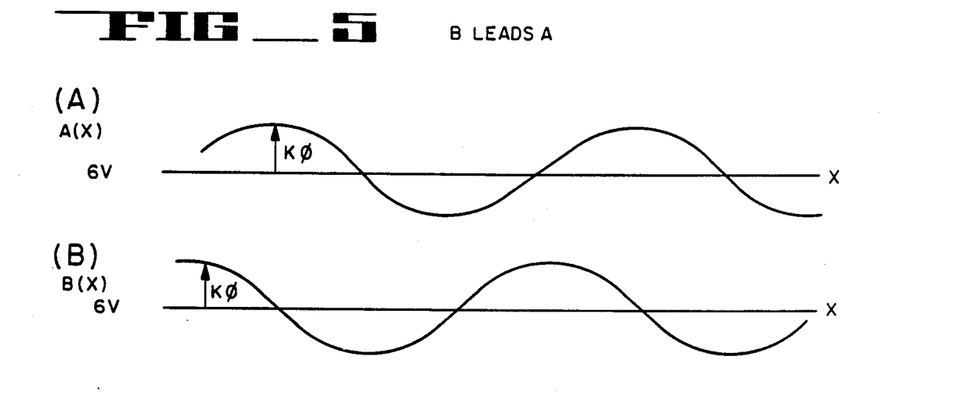

The incremental movement of the motor 11 is represented by analog quadrature output signals A(x) 13 and B(x) 14 as shown in FIGS. 5(a–b) and 7(a–b). Referring to FIGS. 5(a–b) and 7(a–b), the analog quadrature outputs A(x) 13 and B(x) 14 can be described by the following equations:

$$A(x) = K0 * \sin(x) + 6$$

$$B(x) = K0 * \cos(x) + 6$$

where K0 is a scaling factor and is typically 4 volts, while the +6 is a 6 volt offset associated with the incremental encoder 12.

Index(x) 15 along with A(x) 13 and B(x) 14 is used as a reference to load the position up/down counter 24 to a known count whenever the motor 11 has moved through a known position. This is used for two purposes:

(1) to initialize the position up/down counter during motor start up; and
(2) to recover the correct count for the position up/down counter 24 in the case that electrical noise has caused the position up/down counter 24 to miscount.

The A(x) 13 and B(x) 14 analog output signals are sine and cosine signals with an equal amplitude centered about a direct current (DC) reference voltage of six volts (6 V). Although the preferred embodiment uses a DC reference voltage of six volts to cancel out the 6 volt offset associated with the incremental encoder 12, any voltage scheme can be used depending on the voltage characteristics of the encoder used and still remain within the spirit and scope of the present invention. Thus, the following scheme of the preferred embodiment can easily be extended to encoder output signals centered on any arbitrary reference voltage.

Figure 7:
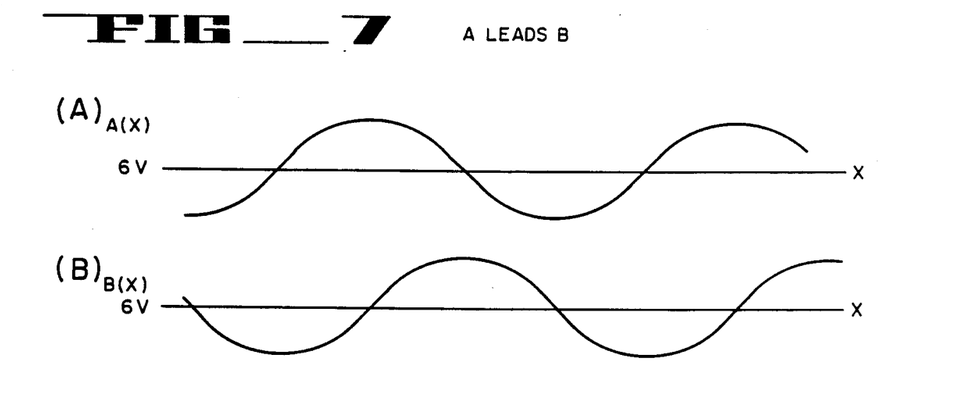

Please note that the difference between FIGS. 5(a–b) and 7(a–b) is that in FIGS. 5(a–b), B(x) 14 leads A(x) 13 and in FIGS. 7(a–b), A(x) leads B(x). As a result, all the discussion in reference to FIGS. 5(a–b) are applicable to FIGS. 7(a–b).

Figure 2:
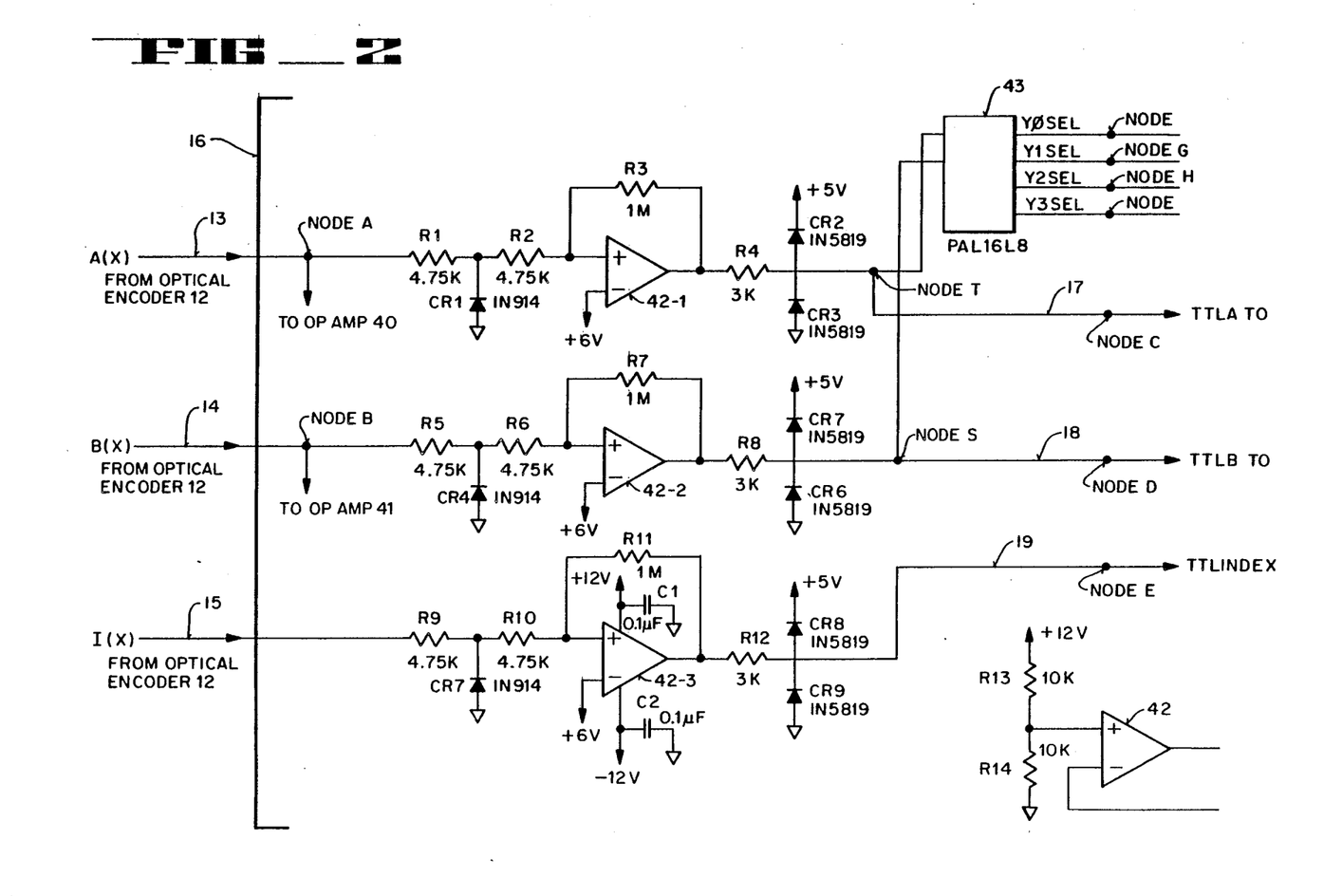
FIG. 2 is a schematic representation of a section of the optical encoder signal conditioning circuitry representing the squaring means of the optical encoder as described in FIG. 1.
Figure 3:
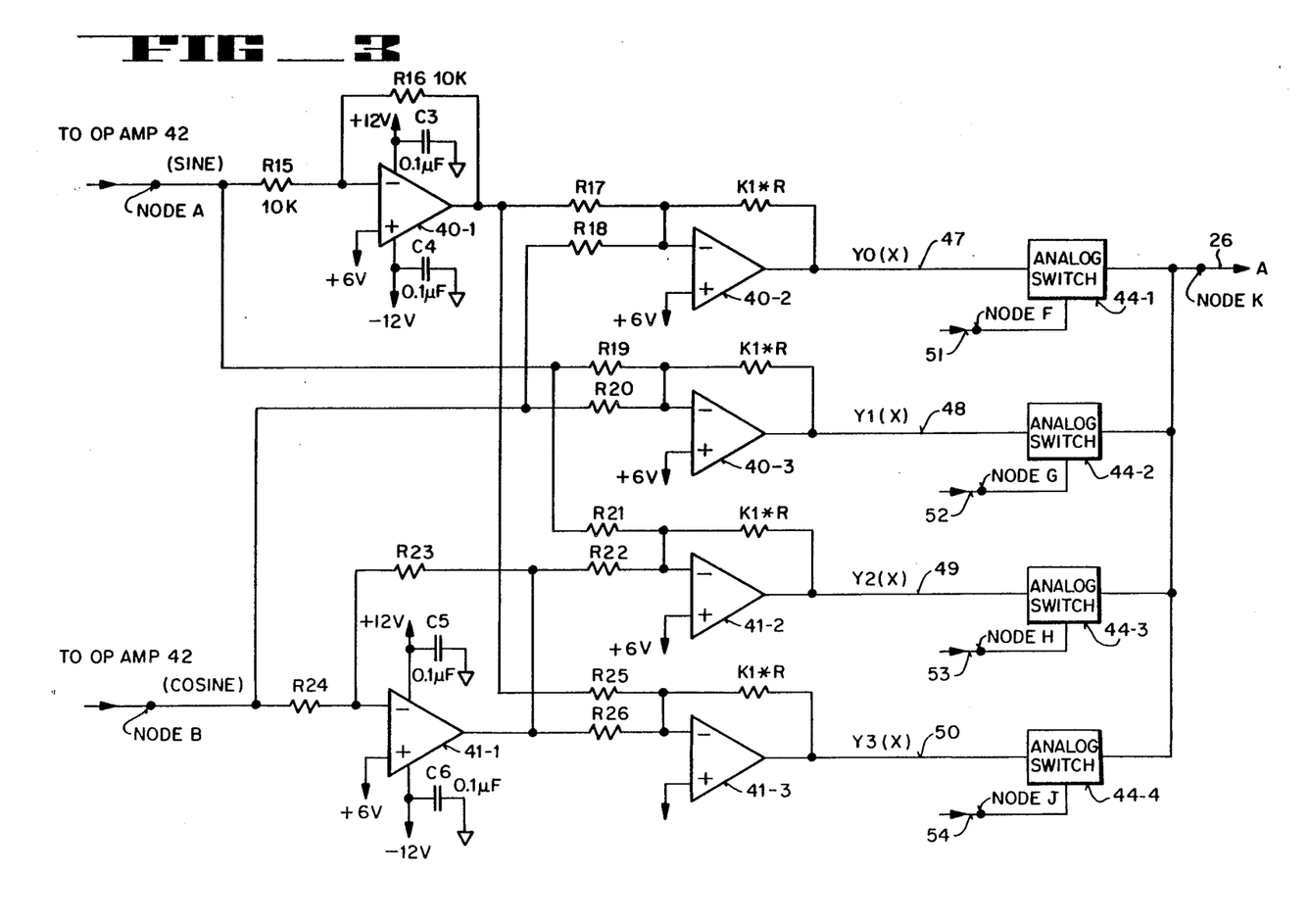
FIG. 3 is a schematic representation of another section of the optical encoder signal conditioning circuitry representing the analog sinusoidal waveforms corresponding to Y0(x), Y1(x), Y2(x) and Y3(x) as described in FIG. 1.

The analog output signals A(x) 13 and B(x) 14 of the incremental optical encoder 12 along with an Index (x) signal are used to define the absolute motor position and are coupled to the input of the optical encoder conditioning circuitry 16 (see FIGS. 2 and 3). Two sets of positional reference signals are output from the conditioning circuitry 16.

The first set of positional reference signals is in the shape of a square wave, compatible to transistor to transistor logic (TTL) signals. The analog signals A(x) 13 and B(x) 14, as well as the Index(x) 15, are output as TTLA 17, TTLB 18 and TTLIndex 19, respectfully. TTLA 17, TTLB 18 and TTLIndex 19 are coupled at Nodes C, D and E, respectively, to the input of an encoder/decode logic array 20. In the preferred embodiment, the encoder/decode logic is a PAL22V10 (see FIG. 9). However, any programmable array logic device operating similarly to a PAL22V10 can be used and still be within the spirit and scope of the present invention.

The second set of signals comprise a six volt reference (+6 V ref) line 25, as well as analog servo (Anlgsrvo) signal 26. The +6 VRef line 25 and Anlgsrvo signal 26 are coupled at Nodes K and L, respectively, to the input of an analog switch 27 (see FIGS. 3 and 4).

Figure 9A:
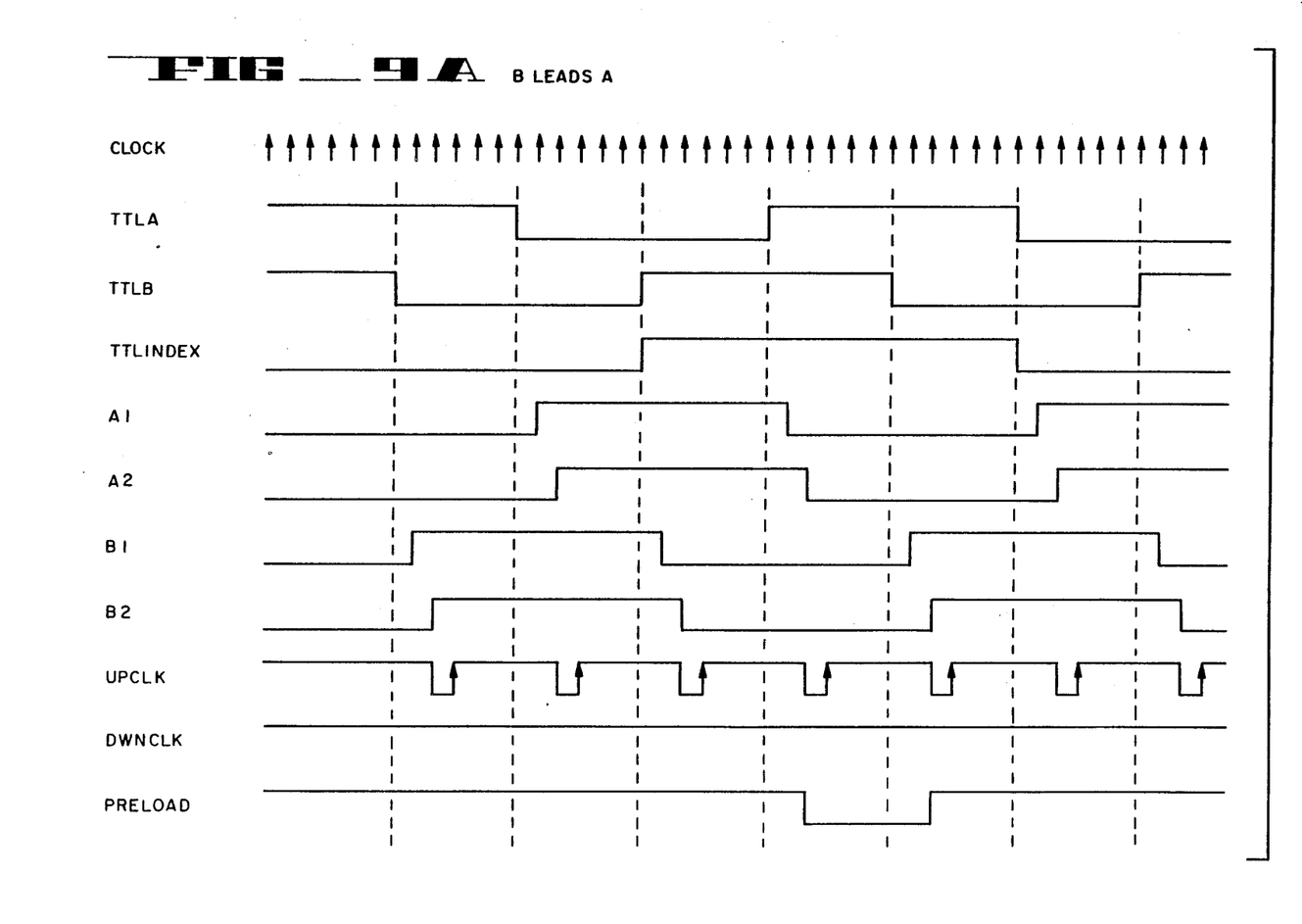
FIGS. 9(a)-(b) are timing charts illustrating the programmed logic of the encoder/decode logic device described in FIG. 1.
Figure 9B:
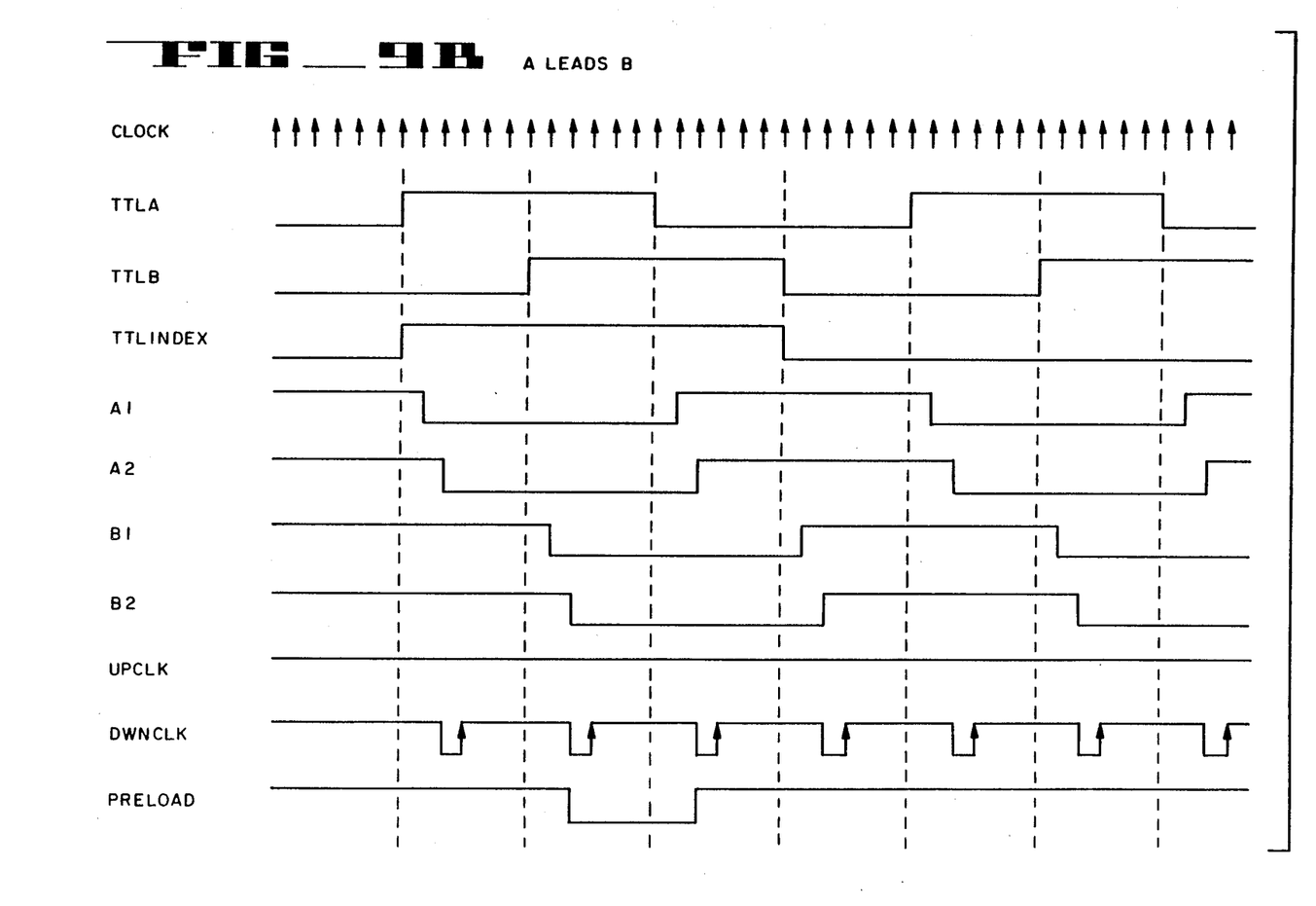

In reference to FIG. 9, the output of the encoder/decode logic device 20 provides a count up clock (UPCLK) signal 21 (see FIG. 9(a)), a count down clock (DWNCLK) signal 22 (see FIG. 9(b)) and a preload (PRELOAD) signal 23, which loads the position up/down counter 24 to a known count. The encoder/decode logic device 20 decodes the edges of the TTLA 17 and TTLB 18 square waves that are coupled to the input of the encoder/decode logic device 20 as well as detecting the TTLIndex 19 signal.

The position quadrants are identified by whether the combination of the TTLA 17 and TTLB 18 lines define a pair of levels as follows:

high-high (HH); high-low (HL); low-high (LH); and low-low (LL)

The encoder/decode logic device 20 determines the direction of motor 11 travel by detecting the edges of TTLA 17 and TTLB 18. Referring to FIG. 9(a), if TTLB 18 is leading TTLA 17, then a count UPCLK signal 21 is generated at every position quadrant boundary. Similarly, in reference to FIG. 9(b), if TTLB 18 is lagging TTLA 17, then a count DWNCLK signal 22 is generated at every position quadrant boundary. These clock signals 21-22 then clock the motor position up/down counter 24 whose output represents absolute motor position.

The encoder/decode logic device 20 is defined by the following equations:

$$A1: = !\left[(TTLA)\right]$$

$$A2: = !\left[(A1 \cdot TTLA) + (A2 \cdot A1) + (A2 \cdot TTLA)\right]$$

$$B1: = !\left[(TTLA)\right]$$

$$B2: = !\left[(B1 \cdot TTLB) + (B2 \cdot B1) + (B2 \cdot TTLB)\right]$$

$$\begin{aligned}UPCLK: = \ &!\left[(TTLA \cdot TTLB \cdot A1 \cdot A2 \cdot B1 \cdot B2) + \right.\\ &(TTLA \cdot TTLB \cdot A1 \cdot A2 \cdot B1 \cdot B2) + \\ &(TTLA \cdot TTLB \cdot A1 \cdot A2 \cdot B1 \cdot B2) + \\ &\left.(TTLA \cdot TTLB \cdot A1 \cdot A2 \cdot B1 \cdot B2)\right]\end{aligned}$$

$$\begin{aligned}DWNCLK: = \ &!\left[(TTLA \cdot TTLB \cdot A1 \cdot A2 \cdot B1 \cdot B2) + \right.\\ &(TTLA \cdot TTLB \cdot A1 \cdot A2 \cdot B1 \cdot B2) + \\ &(TTLA \cdot TTLB \cdot A1 \cdot A2 \cdot B1 \cdot B2) + \\ &\left.(TTLA \cdot TTLB \cdot A1 \cdot A2 \cdot B1 \cdot B2)\right]\end{aligned}$$

$$\begin{aligned}PRELOAD: = \ &!\left[(TTLA \cdot TTLB \cdot TTLINDEX \cdot A1 \cdot \right.\\ &A2 \cdot B1 \cdot B2) + (TTLA \cdot TTLB \cdot TTLINDEX \cdot \\ &A1 \cdot A2 \cdot B1 \cdot B2) + \\ &\left.(PRELOAD \cdot A1 \cdot A2 \cdot B1 \cdot B2)\right]\end{aligned}$$

where A1, A2, B1, and B2 are state variables and !A1, !A2, !B1, and !B2 are the inverse states. These states are internal to the programmable array logic device implemented as the encoder/decode logic device 20.

Figure 6:
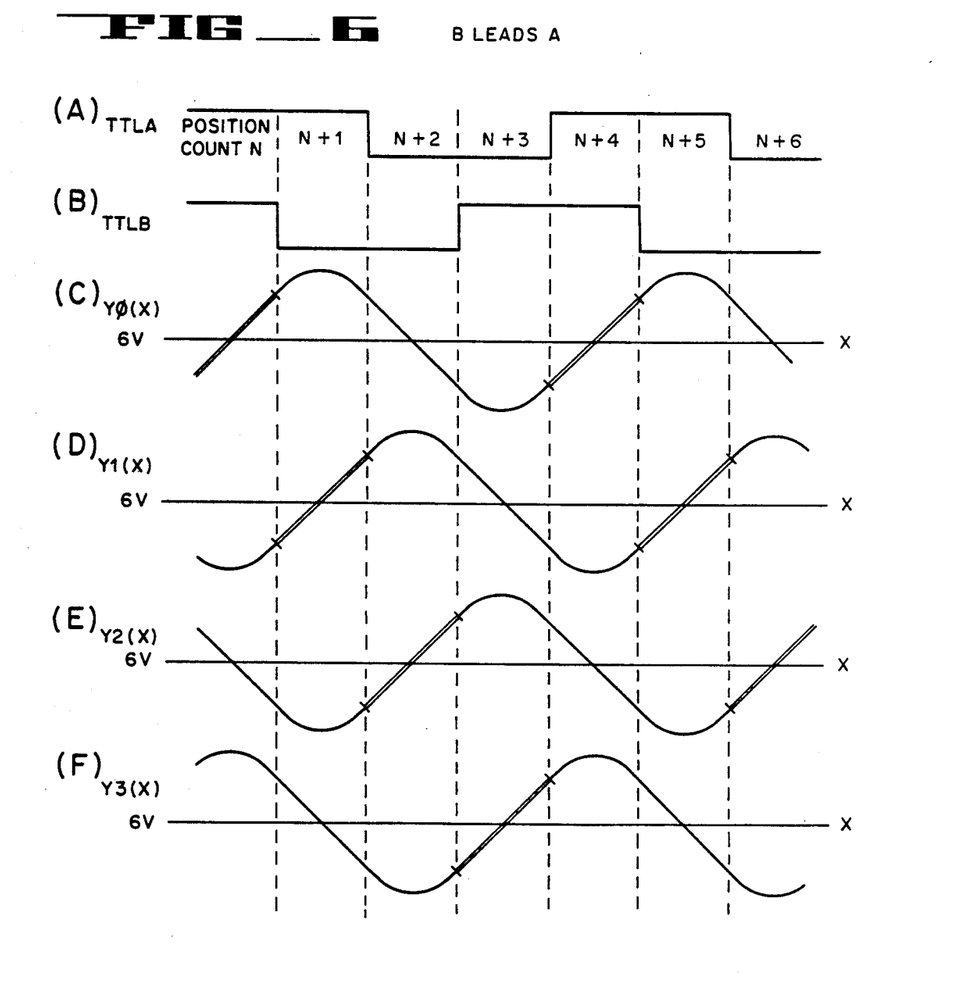

For example, if the operator wants to move the motor 11 into the third quadrant, as shown in FIGS. 6(c-f) and described as n+2, then motor position up/down counter 24 counts to n+2. In order to position the motor 11 and to identify the position within the third quadrant (n+2), the edges of quadrants, n+1 and n+3 must also be identified. Although the up/down counter 24 used in the preferred embodiment is comprised of several ALS193 devices, any similarly functioning counter or combination of counters could be used and still be within the scope of the present invention.

Using the decoded edges of TTLA 17 and TTLB 18 as references to identify the adjacent prior position quadrant and the subsequent position quadrant with reference to the desired position quadrant, a position feedback signal 29 is generated. For example, if the motor 11 drifts into the n+3 quadrant then a position error signal 34 is generated with the proper polarity, driving the motor 11 back into the n+2 quadrant. Likewise, if the motor 11 drifts to the n+1 quadrant, the decoded edge generates a position error signal 34 in the opposite polarity, driving the motor 11 back into the n+2 quadrant. The position error signal 34 associated with the quadrant edges is generated only if the motor 11 crosses the decoded edge boundaries.

On the other hand, using the second set of positional information the Anlgsrvo signal 26 and the +6 VRef line 25 (see FIGS. 3 and 4) is used to define the center of a quadrant. Furthermore, the Anlgsrvo signal 26 is a continuous signal, that is, for all time (t), a correction signal is present.

Figure 4:
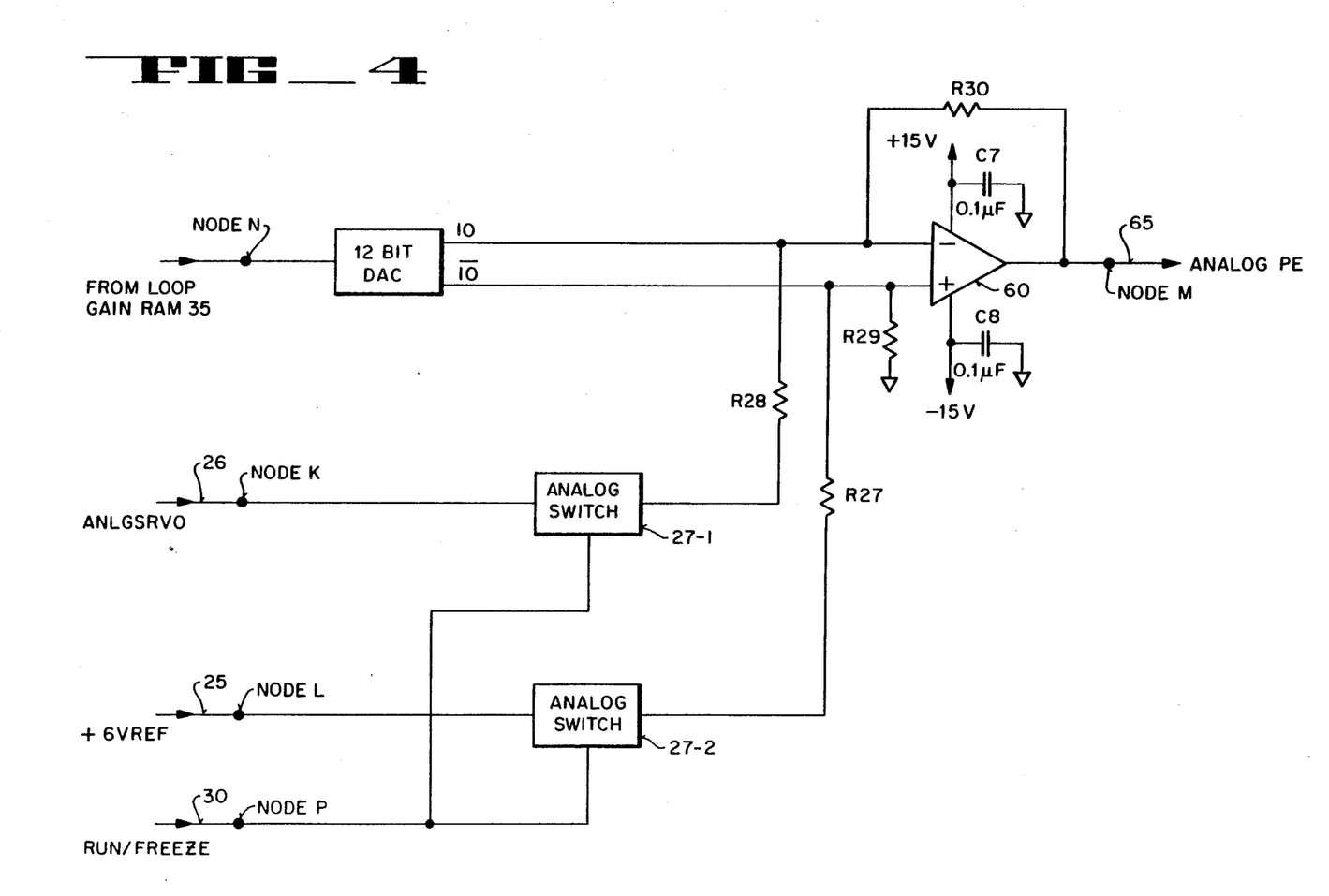
FIG. 4 is a schematic representation of an analog switch and the summing point as described in FIG. 1.
Figure 8:
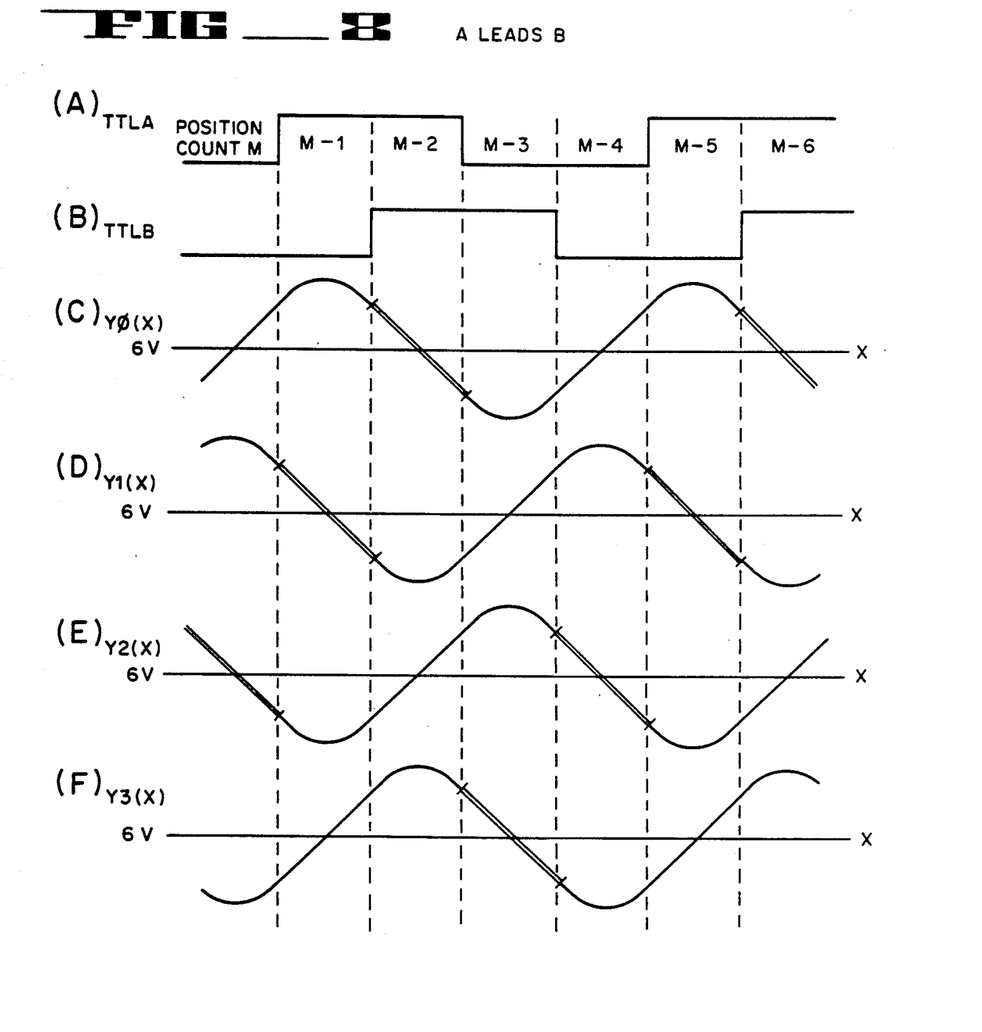

FIG. 4 describes in detail the +6 VRef line 25, the Anlgsrvo signal 26 and run/freeze control line 30 coupled to the input of an analog switch 27. The sinusoidal waves representing the Anlgsrvo signal 26 are shown in FIGS. 6(c-f) and 8(c-f). The descriptions of FIGS. 6(c-f) are applicable to FIGS. 8(c-f), since FIGS. 8(c-f) are merely the reverse of FIGS. 6(c-f). The output lines of the analog switch 27 are identified as switched +6 VRef 38 and switched Anlgsrvo 39 are coupled to the output of the 12 bit DAC 36 and define a summing point 28.

Referring now to FIGS. 1-3, a section of the optical encoder signal condition circuitry 16 detailing the squaring means of the analog signal A(x) 13 and B(x) 14 is described. The output signals A(x) 13, B(x) 14 and Index(x) 15 of the incremental optical encoder 12 are coupled to the input of the conditioning circuitry 16 as shown in FIG. 1.

Referring specifically to FIG. 2 and in the preferred embodiment, the analog signals A(x) 13 and B(x) 14 are coupled at Node A and Node B to the input of a 14-pin quad operational amplifier (op amp) 42 and to another pair of op amps 40 and 41 (see FIG. 3).

FIG. 2 describes in specific detail the circuitry employed in the practice of the present invention. The identification of a particular circuit and specific values for resistors, capacitors and reference voltages are merely used as illustrative references and should in no way be construed to limit the scope of the present invention.

With the proviso stated above, the following is a detailed description of the squaring means used in the preferred embodiment of the present invention. Additionally, the squaring means detailed is applicable to both A(x) 13 and B(x) 14.

Describing the analog output signal A(x) 13, the signal A(x) 13 is coupled at Node A to the input of an op amp 42-1. The op amp 42-1 is configured to function as a comparator. The op amp 42-1, as evidenced by the ratio of the feedback resistor R3 to the input resistor R2, is overdriven, thus creating a square wave, compatible with TTL signals.

The output of the op amp 42-1 is then clamped via a pair of clamping diodes CR2 and CR3, thus generating the squared signal TTLA signal 17. Likewise, the analog signal B(x) 14 is coupled at Node B to op amp 42-2 and is likewise overdriven and squared with a pair of diodes CR6 and CR7, creating a squared TTLB signal 18. Finally, Index(x) 15 is converted to a squared TTLIndex signal 19.

While the single DIP 14 pin quad op amp (Model No. LF347) is shown in the preferred embodiment, it would be obvious to one skilled in the art to use discrete devices as opposed to a multi-pin package. The TTLA 17, TTLB 18 and TTLIndex 19 signals, as described above are used to define the motor quadrant positions and to generate the absolute digital motor position.

The output signals TTLA 17, TTLB 18 and TTLIndex 19 are coupled at Nodes C, D and E, respectively to the encoder/decode logic device 20 (see FIGS. 1 and 9).

Additionally, as shown by Nodes T and S, the TTLA 17 and TTLB 18, respectively are coupled to the input of a programmable array logic device (PAL) 43, which generates a Y0SEL L 51, Y1SEL L 52, Y2SEL L 53, and Y3SEL L 54. The select SEL signals 51-54 encoded by the PAL 43 provide control signals for the analog switch 44. The Y0SEL L 51, Y1SEL L 52, Y2SEL L 53 and Y3SEL L 54 select the appropriate Y0(x) 47, Y1(x) 48, Y2(x) 49 or Y3(x) 50 (see FIG. 3) for the position motor 11 to servo on, depending upon which position quadrant the motor 11 is in. The equations used to define Y0SEL L 51, Y1SEL L 52, Y2SEL L 53 and Y3SEL L 54 for the PAL 43 are as follows:

$$Y0SEL\ L = !(TTLA\ \&\ TTLB)$$

$$Y1SEL\ L = !(TTLA\ \&\ !TTLB)$$

$$Y2SEL\ L = !(!TTLA\ \&\ !TTLB)$$

$$Y2SEL\ L = !(TTLA\ \&\ TTLB)$$

The four select SEL signals 51-54 are coupled at Nodes F, G, H and J to the input of analog switch 44-1, 44-2, 44-3 and 44-4, respectively (see FIG. 3).

Referring now to FIG. 3, the analog signals A(x) 13 and B(x) 14 are also coupled to Nodes A and B, respectively to quad op amps 40 and 41 respectively, and result in four analog phase-shifted sinusoidal waves as shown in FIG. 6(c-f) and 8(c-f). The op amps 40-1, 40-2 and 40-3 and 41-1, 41-2 and 41-3 sum and subtract the input signals performing algebraic operations on A(x) 13 and B(x) 14 to generate Y0(x) 47, Y1(x) 48, Y2(x) 49 and Y3(x) 50. The sinusoidal wave forms 47-50 are defined by the following four algebraic equations:

$$Y0(x) = [K1 * K0 * [\sin(x) - \cos(x)]] + 6$$

$$Y1(x) = [-K1 * K0 * [\sin(x) + \cos(x)]] + 6$$

$$Y2(x) = [-K1 * K0 * [\sin(x) + \cos(x)]] + 6$$

where K0 is the amplitude of A(x) 13 and B(x) 14 and K1 is defined as a gain control.

Referring to FIGS. 6(c-f) and 8(c-f), the graphic representations of the four algebraic equations are illustrated in FIGS. 6(c-f) and 8(c-f).

Y0(x) 47, Y1(x) 48, Y2(x) 49 and Y3(x) 50 are sinewaves with sequential phase shifts of 90° with respect to each other and are centered on a DC reference voltage of 6 volts. The heavy line shading shown in FIGS. 6(c-f) and FIGS. 8(c-f) are portions of the Y0(x) 47, Y1(x) 48, Y2(x) 49 and Y3(x) 50 that are the linear portions of the sinusoidal wave form ranging from −45° to +45°, and referenced to a 6 V center line. As a result, the algebraic equations can be defined as the linear function of the motor 11 position for the linear portion of the sinewave described above. The gain factor (slope) of this linear portion of the sinusoid is determined by K1 and K0.

For example, the linear portion of Y0(x) 47 occurs for the quadrant where TTLA 17 is equal to 1 and TTLB 18 is equal to 1. Similarly, the linear portion of Y1(x) 48, Y2(x) 49 and Y3(x) 50 occurs for the quadrants when TTLA 17 is equal to 1 and TTLB 18 is equal to 0, TTLA 17 is equal to 0 and TTLB 18 is equal to 0, and TTLA 17 is equal to 0 and TTLB 18 is equal to 1, respectively. Thus, there is an analog motor position signal 26 generated for all possible quadrant positions. The zero (0) crossings of these linear positions of Y0(x) 47, Y1(x) 48, Y2(x) 49 and Y3(x) 50 correspond to the middle of these respective position quadrants.

Still referring to FIG. 3, the output signals Y0(x) 47, Y1(x) 48, Y2(x) 49 and Y3(x) 50 are coupled to the analog switches 44-1 to 44-4. In the preferred embodiment the analog switch 44 is a single device providing individual switches. However, it would be obvious to one skilled in the art that individual devices could be used as well.

The select SEL signals 51-54 as described above and in reference to FIG. 2 are coupled at Nodes F, G, H and J to switches 44-1, 44-2, 44-3 and 44-4, respectively. The select SEL signals 51-54 select the appropriate Y0(x) 47, Y1(x) 48, Y2(x) 49 or Y3(x) 50 for the position loop to servo on depending on which position quadrant the motor 11 is in.

Referring to FIG. 4, the analog position error signal 65 is described. The quadrant position error signal 34 generated as the motor 11 drifts from one edge of a quadrant to the other edge and is coupled to the input of the 12 bit DAC 36 via the loop gain RAM 35. The Anlgsrvo signal 26, the +6 VRef signal 25, as well as the run/freeze control line 30, are coupled to the analog switch 27. The output of the analog switch 27, that is, the input of the switched Anlgsrvo signal 39 and the switched +6 VRef signal 38 are coupled along with the output of the 12 bit DAC 36 to an analog op amp 60. The output signal generated from the analog operational amplifier 60 is the analog motor position erro signal 65.

When the motor 11 is stopped at a given digital position, the Anlgsrvo signal 26 and the +6 VRef 25 are switched into the position control loop with the run/freeze control bit 50 selected to freeze. The Anlgsrvo signal 26 is then compared to the +6 VRef signal 25 to create an analog position error signal 65, such that the motor 11 can servo on within the digital position count. Recall that within a given correct quadrant position, there is no position error signal 34 generated from the difference between the POSCMD 33 and the digital motor position counter 24. To stop the motor 11 at the zero crossing of the linear portion of the Y0(x) 47, Y1(x) 48, Y2(x) 49 and Y3(x) 50 an appropriate analog motor position signal 26 is compared to +6 VRef signal 25 and creates the continuous analog position error signal 65 used to correct for any motor 11 position drift within that quadrant.

Referring to FIGS. 5(a-b) and FIG. 6(a-f), they can be described identically to FIGS. 7(a-b) and FIGS. 8(a-f) with the only difference being that B(x) 14 leads A(x) 13 as opposed to A(x) 13 leading B(x) 14. In other words, one set of signals defines the probe 10 position moving upward or outward, whereas the other set of signals defines the probe 10 position moving downward or inward, depending upon the point of reference.

While the illustrative example is disclosed as being applied to an ultrasound sensing probe in medical diagnostic devices, it is believed that the methodology would be equally appliable in a wide variety of other applications commonly employing a servomotor control positioning loop.

While the preferred embodiment of the invention has been described above, the invention may be embodied otherwise than as specifically illustrated herein, and that certain changes in the form and the arrangement of parts may be made without departing from the underlying idea or principles of this invention within the scope of the following claims.

Thus as described, a method of deriving the analog position error signal from an optical incremental encoder.

We claim:

1. In a servo control system, an apparatus for processing output signals of an incremental optical encoder, said apparatus imbedded in said servo control system, said optical encoder coupled to a servomotor, said output signals comprised of a pair of analog signals representative of the position of said servomotor, said apparatus comprising:
   a first analog device coupled to said encoder that converts said pair of analog signals to a pair of digital square wave signals;
   a decoding device coupled with said first analog device, said decoding device for decoding said pair of digital square waves into position quadrants and defining an absolute motor position;
   a counting means coupled with said decoding device, said counting means for causing said servomotor to move to a specific position quadrant;
   a second analog device coupled to said encoder that converts said pair of analog signals to a plurality of phase shifted analog sinusoidal waveforms, said second analog device further coupled to a first switching means:
   said first switching means for selecting an associated one of said plurality of phase shifted analog sinusoidal waveforms as output; said first switching means coupled to a second switching means;
   a logic array device coupled to said first analog device, said logic array device programmed to decode said pair of digital square waves to yield a plurality of select signals, said logic array device further coupled to said first switching means;
   a reference generation means for generating a base reference signal; said reference generation means coupled to said second switching means;
   said second switching means having an output coupled to a third analog device such that said third analog device compares said output to said reference signal, wherein said comparison yields an analog position error signal within said position quadrant.

2. The apparatus of claim 1 wherein said pair of analog signals output from said optical encoder are analog quadrature outputs defined as sine and cosine signals of equal amplitude centered about a direct current reference voltage.

3. The apparatus of claim 2 wherein said first analog device is a pair of comparators.

4. The apparatus of claim 3 wherein said second analog device is a plurality of inverters.

5. The apparatus of claim 4 wherein said logic array device is a programmable array logic device.

6. The apparatus of claim 5 wherein said first switching means is a plurality of analog switches.

7. The apparatus of claim 6 wherein said third analog device is an analog operational amplifier.

8. In a servo control system, said servo control system couled to a servomotor, said servomotor including an incremental optical encoder, said optical encoder providing a pair of analog quadrature signals representing a position of said servomotor, a method for positioning said servomotor using said pair of analog quadrature signals of said incremental optical encoder, said method comprising the steps of:
   incrementally moving said servomotor, thereby generating a pair of analog quadrature signals from said optical encoder;
   converting said pair of analog quadrature signals to a pair of digital square wave signals;
   converting, simultaneously said pair of analog quadrature signals to a plurality of analog phase shifted sinusoidal waveforms;
   decoding said pair of digital square wave signals such that a pair of levels from said pair of digital square wave signals define a position quadrant;
   decoding, simultaneously said pair of digital square wave signals into a plurality of select signals that control a switching means coupled to said plurality of analog phase shifted sinusoidal waveforms;
   counting said position quadrants to move said servomotor to a specific position quadrant, based on the contents of a counter;
   selecting one of said plurality of analog phased shifted sinusoidal waveforms by means of said switching means, controlled by said plurality of select signals;
   generating a reference signal to cancel out the effects of a voltage offset associated with said incremental encoder;
   comparing said one of said plurality of analog phase shifted sinusoidal waveforms with said reference signal, producing an analog position error signal within said specific position quadrant;
   moving said servomotor in compliance with said analog position error signal until said analog position error signal is equal to zero.

9. An improvement in a method to precisely position a transducer mounted on an ultrasound probe, said transducer coupled to a servomotor including an incremental optical encoder, said incremental optical encoder generating analog signals, said analog signals having a base reference voltage associated with said optical encoder, wherein said analog signals of said encoder are converted to digital signals and are used to position said servomotor in a position quadrant defined by decoding said digital signals, said improved method comprising:
   converting said analog signals to a plurality of analog sinusoidal waveforms, each of said plurality of analog sinusoidal waveforms having a linear portion within the position quadrant associated with said analog sinusoidal waveform, such that said linear portion is centered at a zero crossing of said base reference voltage of said analog signals, and where said plurality of analog sinusoidal waveforms are coupled to the input of an analog switch;

decoding the digital signals with a logic array device to produce control signals, such that said control signals are coupled to the select input of said analog switch;

selecting one of said plurality of analog sinusoidal waveforms based on said control signals, said selection dependant on the position quadrant where the motor is positioned and outputting an analog position signal from said analog switch;

generating a reference signal based on said base reference voltage of said optical encoder;

referencing said analog position signal to said reference signal producing an analog error signal;

moving said servomotor towards the zero crossing of said linear position and in a direction that causes said analog error signal to be equal to zero.

10. An apparatus imbedded in a servo control system, said servo control system coupled to a servomotor, said servomotor further coupled to an incremental optical encoder, said incremental optical encoder providing a plurality of analog signals, said analog signals representing a position of said servomotor, said apparatus comprising:

a first analog device coupled to said encoder, said first analog device for converting each of said plurality of analog signals to a corresponding plurality of digital square wave signals;

a decoding means coupled to said first analog device, said decoding means for decoding said plurality of digital square wave signals into a plurality of position quadrants and an absolute servomotor position;

a counting means coupled to said decoding means, said counting means for causing movement of said servomotor to a specific position quadrant;

a second analog device coupled to said encoder, said second analog device for converting said plurality of analog signals to a plurality of phase shifted analog sinusoidal waveforms; said plurality of phase shifted analog sinusoidal waveforms coupled to a first switching means;

a logic array device coupled to said first analog device, said logic array device programmed to decode said plurality of digital square waves into a plurality of select signals; said plurality of select signals coupled to said first switching means;

said first switching means further coupled to said second analog device, said first switching means for selecting an associated one of said plurality of phase shifted analog sinusoidal waveforms, based on said plurality of select signals, as output, said output coupled to a second switching means;

a reference means for generating a reference signal; said reference means coupled to said second switching means;

said second switching means for enabling said apparatus for controlling movement of said servomotor, said second switching means further coupled to a third analog device, said third analog device for comparing said output of said first switching means with said reference signal, wherein said comparison yields an analog position error signal within said specific quadrant.

* * * * *